(12) United States Patent
Krauss et al.

(10) Patent No.: US 9,050,976 B2
(45) Date of Patent: Jun. 9, 2015

(54) METHOD FOR OPERATING A HYBRID VEHICLE

(71) Applicant: Dr. Ing. h.c. F. Porsche Aktiengesellschaft, Stuttgart (DE)

(72) Inventors: Thomas Krauss, Pilsach (DE); Thomas Rauner, Blaubeuren (DE); Marcos Remedios Marques, Pforzheim (DE)

(73) Assignee: Dr. Ing. h.c. F. Porche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/022,685

(22) Filed: Sep. 10, 2013

(65) Prior Publication Data

US 2014/0074335 A1    Mar. 13, 2014

(30) Foreign Application Priority Data

Sep. 11, 2012  (DE) .......................... 10 2012 108 485

(51) Int. Cl.
*B60W 20/00*     (2006.01)
(52) U.S. Cl.
CPC .............. *B60W 20/50* (2013.01); *Y10S 903/903* (2013.01); *Y02T 10/7077* (2013.01)
(58) Field of Classification Search
None
See application file for complete search history.

(56) References Cited

U.S. PATENT DOCUMENTS

| | | | | |
|---|---|---|---|---|
| 6,405,818 | B1* | 6/2002 | Anthony et al. | 180/65.8 |
| 2009/0143180 | A1* | 6/2009 | Shimizu et al. | 475/127 |
| 2011/0208378 | A1* | 8/2011 | Krueger et al. | 701/22 |
| 2012/0010794 | A1* | 1/2012 | Sahashi et al. | 701/58 |
| 2012/0173038 | A1* | 7/2012 | Davis et al. | 701/1 |
| 2013/0072336 | A1* | 3/2013 | G V et al. | 475/5 |

FOREIGN PATENT DOCUMENTS

| | | |
|---|---|---|
| DE | 10 2011 011 370 A1 | 3/2012 |
| JP | 2010-111291 A | 5/2010 |
| JP | 2011-000915 A | 1/2011 |
| JP | 2012-101616 A | 5/2012 |

OTHER PUBLICATIONS

English translation of JPO Notification of Reason of Rejection in Application No. JP 2013-184629, mailed Aug. 19, 2014.

* cited by examiner

*Primary Examiner* — John R Olszewski
*Assistant Examiner* — Jess Whittington
(74) *Attorney, Agent, or Firm* — RatnerPrestia

(57) ABSTRACT

A method for operating a hybrid vehicle having an internal combustion engine and an electric machine, wherein the hybrid vehicle can be driven purely electrically if the internal combustion engine fails because, for example, a fuel tank for supplying the internal combustion engine with fuel is empty. In the event of failure of the internal combustion engine, continued purely electric travel of the hybrid vehicle is made possible only on condition that a restart of the hybrid vehicle is initiated.

8 Claims, 1 Drawing Sheet

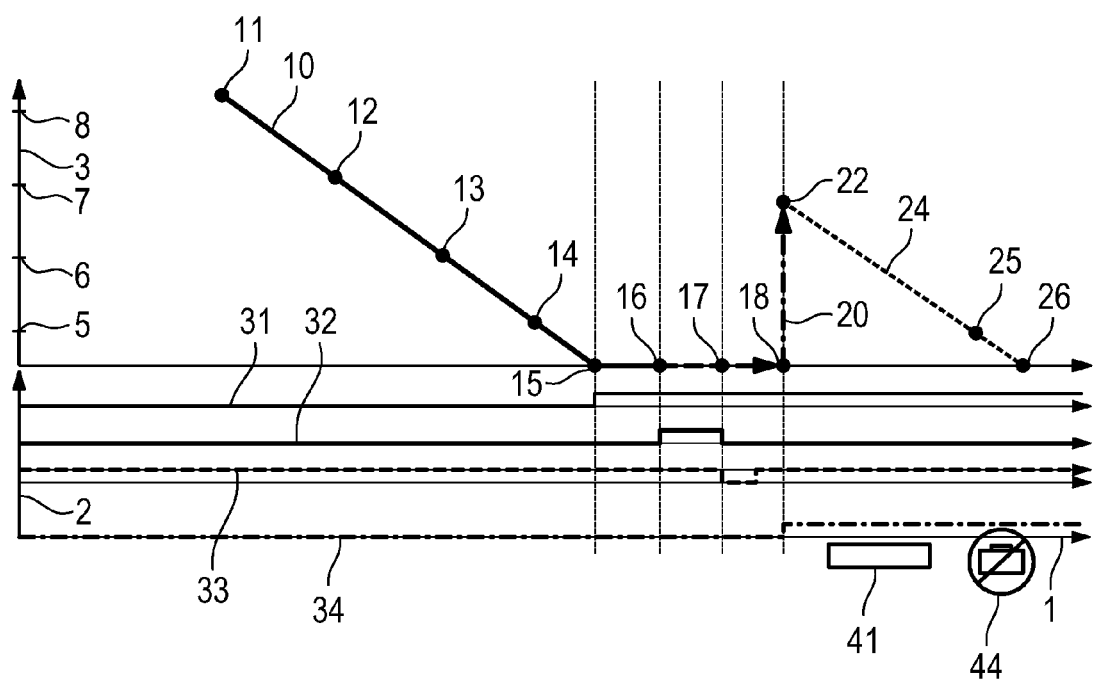

METHOD FOR OPERATING A HYBRID VEHICLE

CROSS-REFERENCE TO RELATED APPLICATIONS

This application claims priority of German Patent Application No. 10 2012 108 485.8, filed Sep. 11, 2012, which is incorporated by reference herein in its entirety.

FIELD OF INVENTION

The invention relates to a method for operating a hybrid vehicle having an internal combustion engine and an electric machine, wherein the hybrid vehicle can be driven purely electrically if the internal combustion engine fails because, for example, a fuel tank for supplying the internal combustion engine with fuel is empty.

BACKGROUND

German Laid-Open Patent Application DE 10 2011 011 370 A1 discloses a method for operating a hybrid vehicle in which there is a problem with an auxiliary power source, for example an internal combustion engine or a fuel cell. A primary power source of the vehicle, which is typically a battery, is protected by a power management scheme in order to make available an extended range to the hybrid vehicle.

SUMMARY

The object of the invention is to improve the safety and/or comfort during operation of a hybrid vehicle having an internal combustion engine and an electric machine, with the result that the vehicle avoids becoming immobilized.

The object is achieved in a method for operating a hybrid vehicle having an internal combustion engine and an electric machine, wherein the hybrid vehicle can be driven purely electrically if the internal combustion engine fails, characterized in that in the event of failure of the internal combustion engine, continued purely electric travel of the hybrid vehicle is made possible only on condition that a restart of the hybrid vehicle is initiated. According to one significant aspect of the invention, a driver of the hybrid vehicle must actively request the restart of the hybrid vehicle. This ensures that the driver is aware that the continued travel of the hybrid vehicle takes place purely electrically.

A preferred exemplary embodiment of the method is characterized in that the continued purely electric travel of the hybrid vehicle is made possible on condition that the restart is initiated when the hybrid vehicle is stationary. After the restart, the hybrid vehicle is preferably in what is referred to as a Limp-Home mode in which the hybrid vehicle is operated as a pure electric vehicle. The continued purely electric travel makes it advantageously possible to drive to a refueling station in order to fill the empty fuel tank.

A further preferred exemplary embodiment of the method is characterized in that the continued purely electric travel of the hybrid vehicle is made possible on condition that an ignition system of the internal combustion engine is first switched off and subsequently switched on again. The switching on and off of the ignition system is also referred to as a terminal change.

A further preferred exemplary embodiment of the method is characterized in that the continued purely electric travel of the hybrid vehicle is made possible on condition that a display element is actively requested. The display element may be, for example, a light bar which is displayed on a display in the hybrid vehicle. The display is, for example, the display of an on-board computer.

A further preferred exemplary embodiment of the method is characterized in that the continued purely electric travel of the hybrid vehicle is made possible on condition that the failure of the internal combustion engine is due to an empty fuel tank. An error pattern can be analyzed in order to detect the empty fuel tank. Deviations of a set point pressure from an actual pressure on a low pressure side and a high pressure side in a fuel system can be used for this purpose. Of course, the filling level of the tank is also used to detect the empty fuel tank.

A further preferred exemplary embodiment of the method is characterized in that the continued purely electric travel of the hybrid vehicle is made possible on condition that the failure of the internal combustion engine is due to an empty fuel tank. The invention relates, in particular, to a Limp-Home mode with continued purely electric travel when the fuel tank is empty.

A further preferred exemplary embodiment of the method is characterized in that the continued purely electric travel of the hybrid vehicle is made possible on condition that an electric energy storage device for supplying the electric machine with electric energy has a sufficient charging capacity. The electric energy storage device is, preferably, a battery, in particular a high voltage battery.

A further preferred exemplary embodiment of the method is characterized in that the continued purely electric travel of the hybrid vehicle is limited in the event of failure of the internal combustion engine, in particular with respect to the rotational speed and the speed of the electric machine. The electric machine is limited, in particular, for reasons of safety and energy consumption.

A further preferred exemplary embodiment of the method is characterized in that in the event of failure of the internal combustion engine in the hybrid vehicle, there is a display indicating that the available drive power of the hybrid vehicle is reduced and/or the fuel tank is empty or has to be refilled. Advantageously there is also a display indicating what distance the hybrid vehicle is able to still cover purely electrically.

A further preferred exemplary embodiment of the method is characterized in that in the event of failure of the internal combustion engine in the hybrid vehicle, there is a display indicating that the continued purely electric travel is possible only on condition that the ignition system of the internal combustion engine is first switched off and subsequently switched on again. This is intended to ensure that the driver becomes aware that the continued travel takes place purely electrically.

A further preferred exemplary embodiment of the method is characterized in that the continued purely electric travel of the hybrid vehicle is made possible only on condition that the internal combustion engine is not started after a defined number of starting attempts. The continued purely electric travel of the hybrid vehicle is advantageously made possible, for example, on condition that the internal combustion engine is not started after three starting attempts.

All the specified examples have in common the fact that the driver requests a restart actively and therefore intentionally, or confirms further travel.

Further advantages, features and details of the invention can be found in the following description in which various exemplary embodiments are described in detail with reference to the drawing.

In the single appended FIGURE, the method according to the invention is illustrated in the form of a Cartesian coordinate diagram with an x axis and two y axes.

BRIEF DESCRIPTION OF THE DRAWINGS

FIG. 1 illustrates a Cartesian coordinate diagram with an x axis 1 and 2 y axes 2, 3. The time is plotted on the x axis 1 in a suitable time unit. Various operating stages of a hybrid vehicle are illustrated on the first y axis 2. The range of the hybrid vehicle is plotted in kilometers on the second y axis 3.

DETAILED DESCRIPTION

Dashes 5, 6, 7 and 8 on the second y axis 3 indicate ranges in the pure internal combustion engine operating mode of the hybrid vehicle of five kilometers, fifteen kilometers, twenty-five kilometers and a hundred kilometers. A linearly dropping line 10 indicates that the range in the pure internal combustion engine operating mode of the hybrid vehicle drops from a point 11 to a point 15 by points 12, 13 and 14.

The point 11 corresponds to a range of more than a hundred kilometers. Point 12 corresponds to a range of approximately twenty-five kilometers. The point 13 corresponds to a range of approximately fifteen kilometers. The point 14 corresponds to a range of approximately five kilometers. The point fifteen corresponds to a range of zero kilometers, that is to say a fuel tank of the hybrid vehicle is empty.

The ranges in the pure internal combustion engine operating mode are advantageously displayed to the driver of the hybrid vehicle at the points 11 to 15. Display of the ranges can be supplemented by messages that the fuel tank has to be refueled soon or immediately.

Alternatively or additionally, for example a bar symbol 41 can be displayed to the driver indicating that one electric machine has to be activated for continued travel.

At the point 15, it can be indicated to the driver by a shield symbol 44 that the fuel tank is empty. Furthermore, by means of an on-board computer the driver can be informed that a restart is not possible until a restart is actively requested by the driver.

If the fuel tank is empty, continued purely electric travel on an empty fuel tank can be made possible to the driver or the hybrid vehicle in what is referred to as a Limp-Home mode. In the Limp-Home mode, the hybrid vehicle can be conveyed purely electrically from hazardous situations or as far as the next refueling station.

In order to detect whether the hybrid vehicle is immobilized owing to an empty fuel tank, an error pattern is analyzed. For example, deviations of the set point pressure and of the actual pressure on the low pressure side and the high pressure side in the fuel system are used for this purpose. Furthermore it is checked whether the engine was stopped without a reason, that is to say whether it died or stalled. Furthermore, the filling level of the tank is used.

Continued purely electric travel is not possible, in particular, until the detection means has detected an empty fuel tank. Furthermore, it is necessary for the driver in the stationary state to actively request a restart of the hybrid vehicle. In FIG. 1 it is indicated that the driver actively requests a restart at three points 16, 17 and 18.

When the restart is requested, for example the ignition of an internal combustion engine of the hybrid vehicle is switched on. If the internal combustion engine does not start after three starting attempts, the continued purely electric travel is enabled, as is indicated by a dot-dash arrow 20.

For safety reasons and energy reasons, the continued purely electric travel is limited with respect to the speed and rotational speed of the electric machine, which is operated as an electric motor. In the Limp-Home mode, the hybrid vehicle is operated as a purely electric vehicle.

The arrow 20 ends at a point 22. Starting from the point 22, information about reduced engine power and a request to refuel are alternately displayed. Continued purely electric travel with an empty fuel tank is indicated by a line 24. At the point 25, it is indicated that at least immobilization is to be expected at the point 26.

In FIG. 1, a first stage in which the internal combustion engine is off because the fuel tank is empty is indicated by a profile 31. A stage 2 in which immobilization owing to the stage 1 has taken place is indicated by a profile 32. An ignition changeover is indicated by a profile 33. An ignition changeover means three attempts to start the motor in order to check the system owing to stage 2. A third stage in which the Limp-Home mode is detected with three starting attempts having taken place is indicated by a profile 34.

What is claimed:

1. A method for operating a hybrid vehicle having an internal combustion engine and an electric machine, comprising the steps of driving the hybrid vehicle purely electrically if the internal combustion engine fails, wherein in the event of failure of the internal combustion engine, continued purely electric travel of the hybrid vehicle occurs only on condition that a restart of the hybrid vehicle is initiated, wherein the continued purely electric travel of the hybrid vehicle occurs only on condition that an ignition system of the internal combustion engine is first switched off and subsequently switched on again, wherein the continued purely electric travel of the hybrid vehicle occurs only on condition that the failure of the internal combustion engine is due to an empty fuel tank, and wherein the continued purely electric travel of the hybrid vehicle occurs only on condition that an electric energy storage device for supplying the electric machine with electric energy has a sufficient charging capacity.

2. The method as claimed in claim 1, wherein the continued purely electric travel of the hybrid vehicle occurs only on condition that the restart is initiated when the hybrid vehicle is stationary.

3. The method as claimed in claim 1, wherein the continued purely electric travel of the hybrid vehicle occurs only on condition that a display element is actively requested.

4. The method as claimed in claim 1, wherein the continued purely electric travel of the hybrid vehicle is limited in the event of failure of the internal combustion engine, with respect to the rotational speed and the speed of the electric machine.

5. The method as claimed in claim 1, wherein in the event of failure of the internal combustion engine in the hybrid vehicle, there is a display indicating that the available driving power is reduced and/or the fuel tank is empty or has to be refilled.

6. The method as claimed in claim 1, wherein in the event of failure of the internal combustion engine in the hybrid vehicle, there is a display indicating that the continued purely electric travel of the hybrid vehicle occurs only on condition that the ignition system of the internal combustion engine is first switched off and subsequently switched on again.

7. The method as claimed in claim 1, wherein the continued purely electric travel of the hybrid vehicle occurs only on condition that the internal combustion engine is not started after a defined number of starting attempts.

8. The method as claimed in claim 1, wherein the internal combustion engine fails if a fuel tank for supplying the internal combustion engine with fuel is empty.

\* \* \* \* \*